C. A. ALBRECHT & C. MUEHLEISEN.
LINOTYPE AND OTHER TYPE CASTING MACHINE.
APPLICATION FILED APR. 10, 1908.
913,447.
Patented Feb. 23, 1909.
9 SHEETS—SHEET 7.
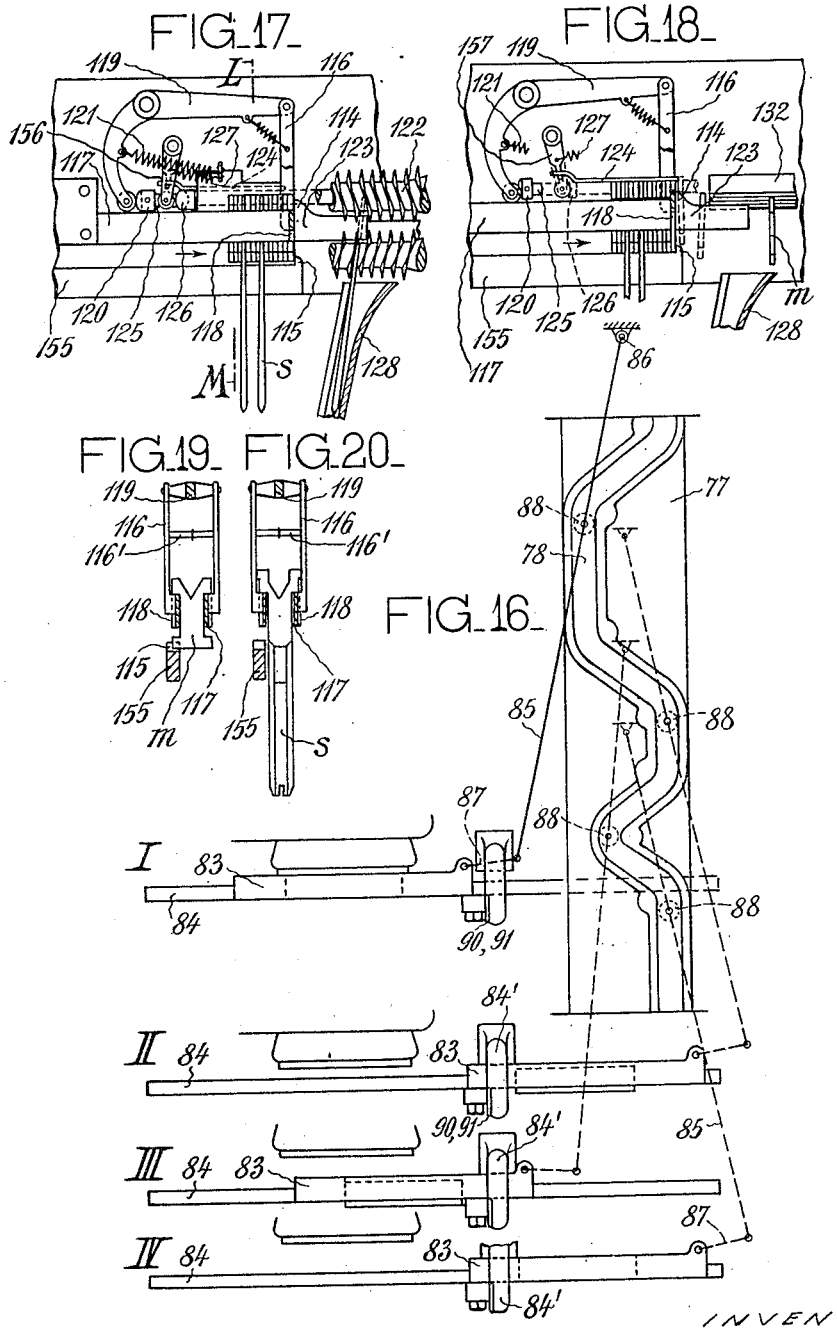
WITNESSES
W. P. Burke
Edw. D. Spring
INVENTORS
Christian A. Albrecht
Carl Muehleisen

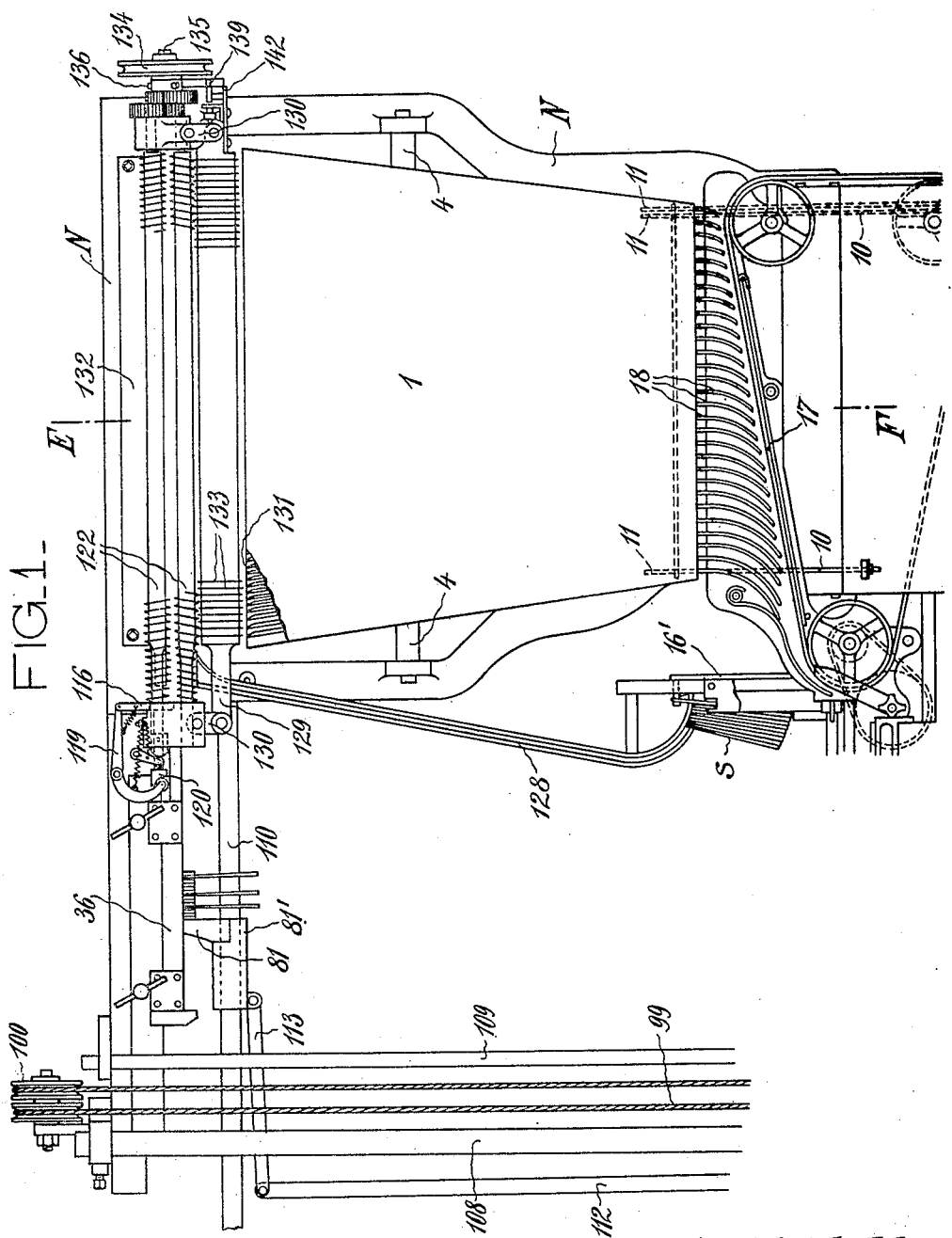

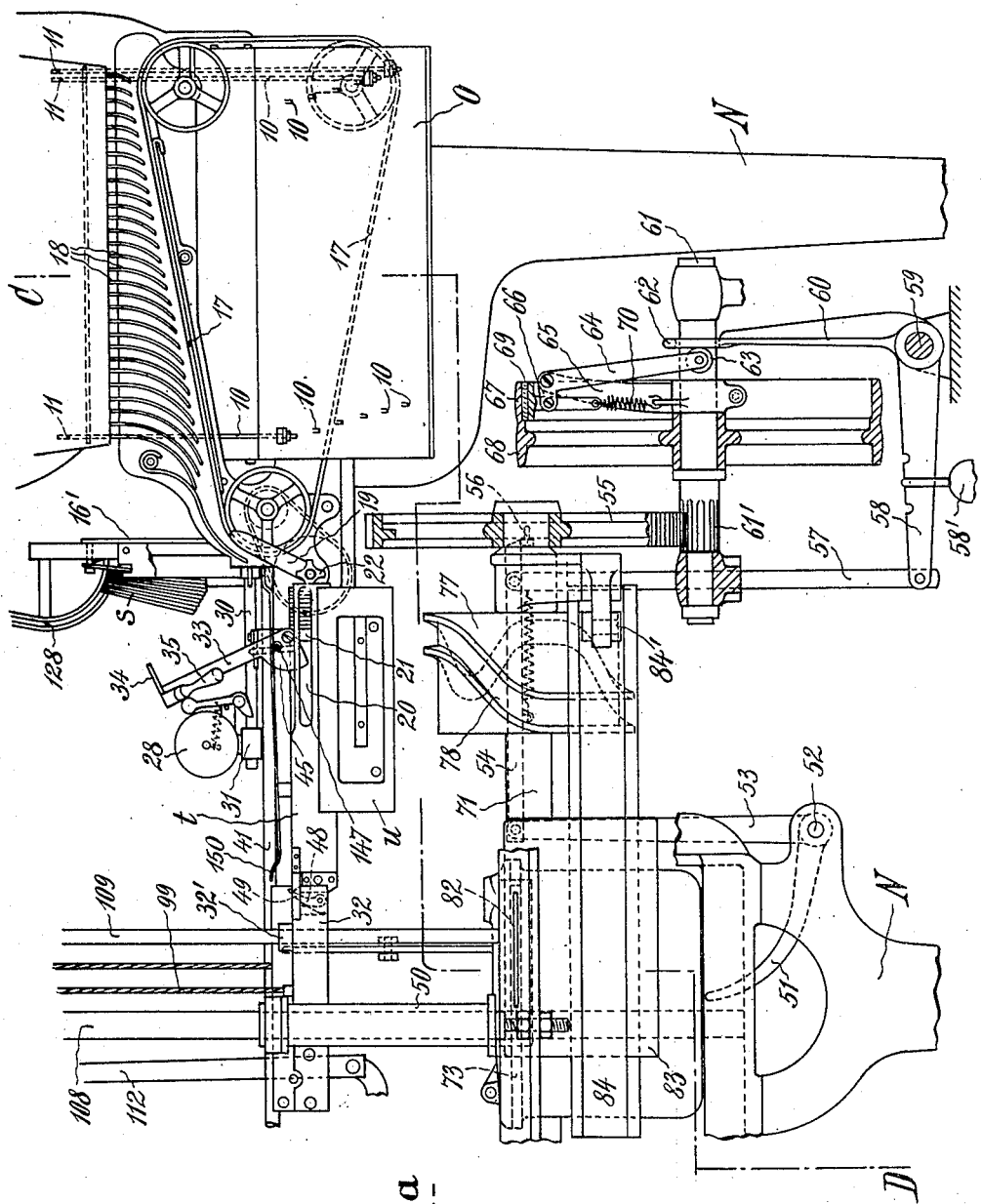

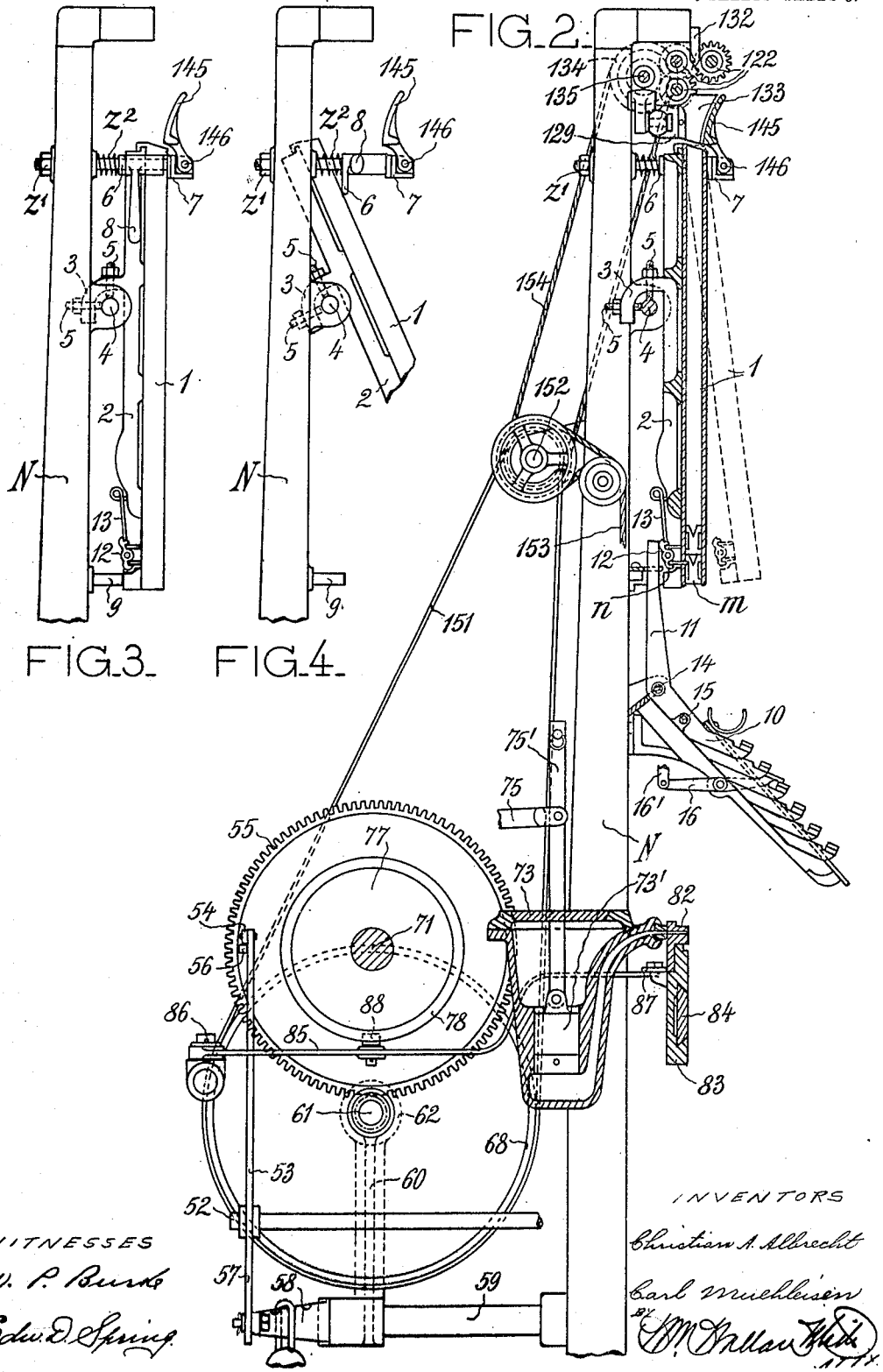

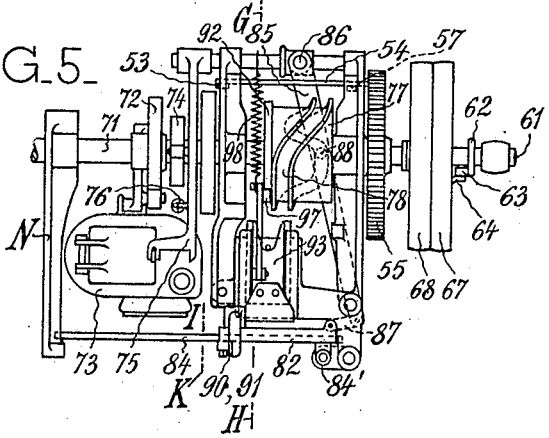
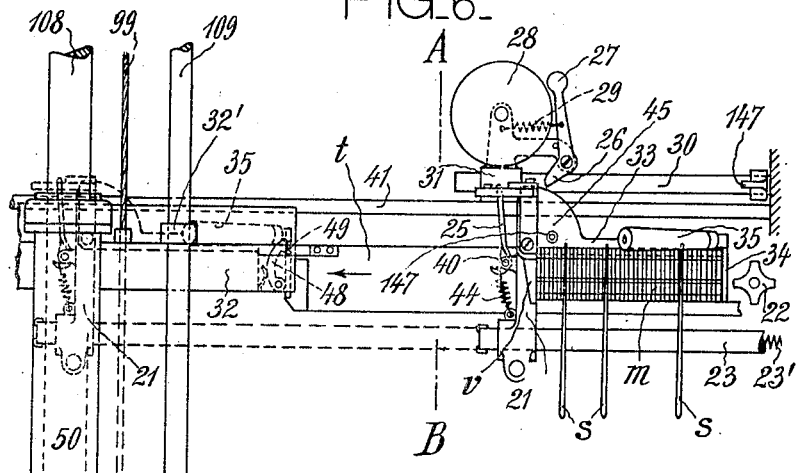
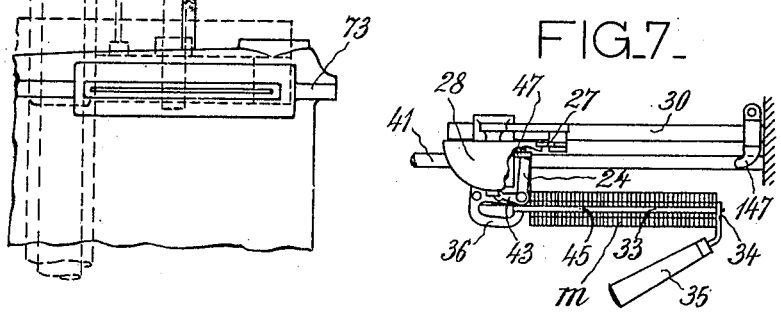

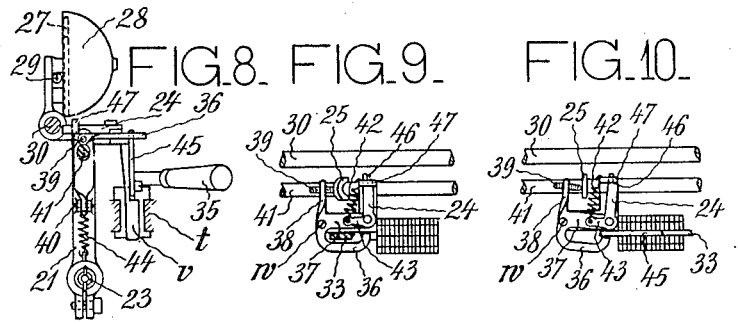
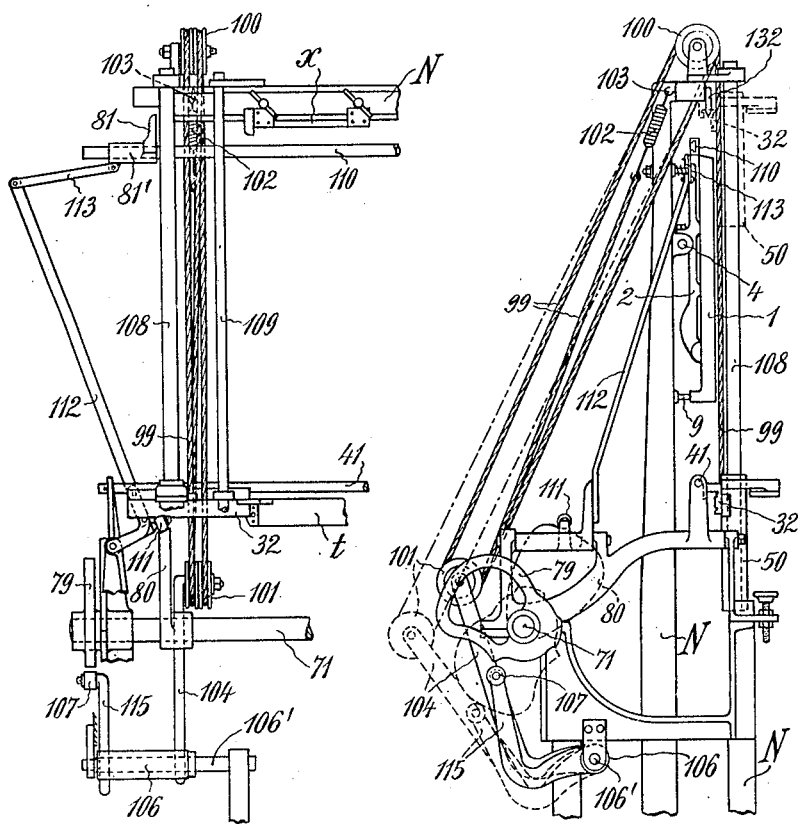

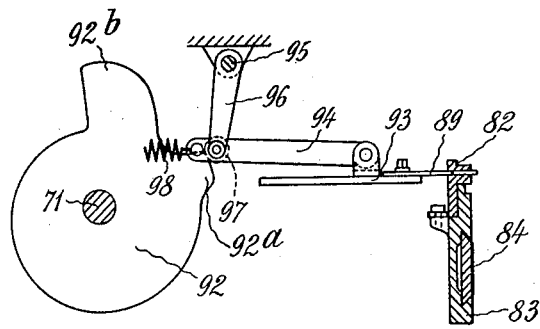
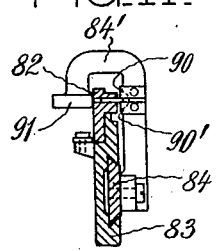
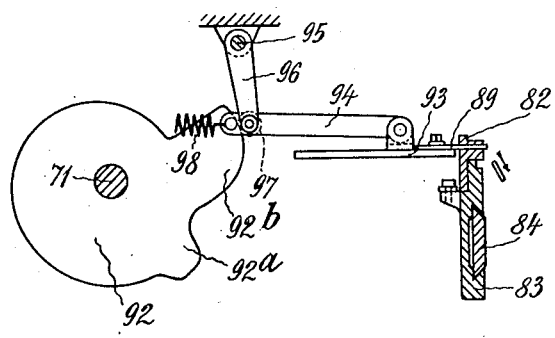

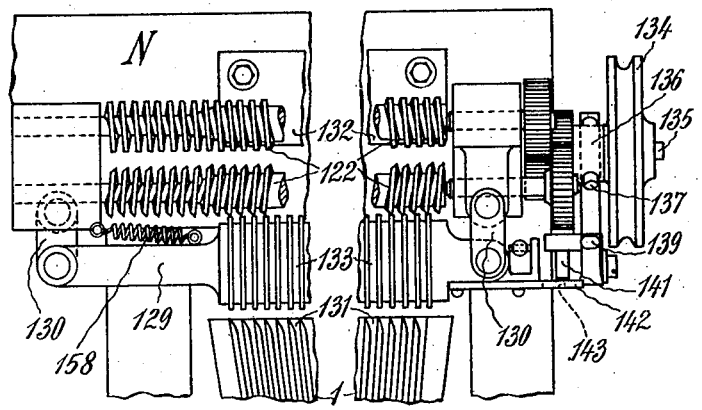
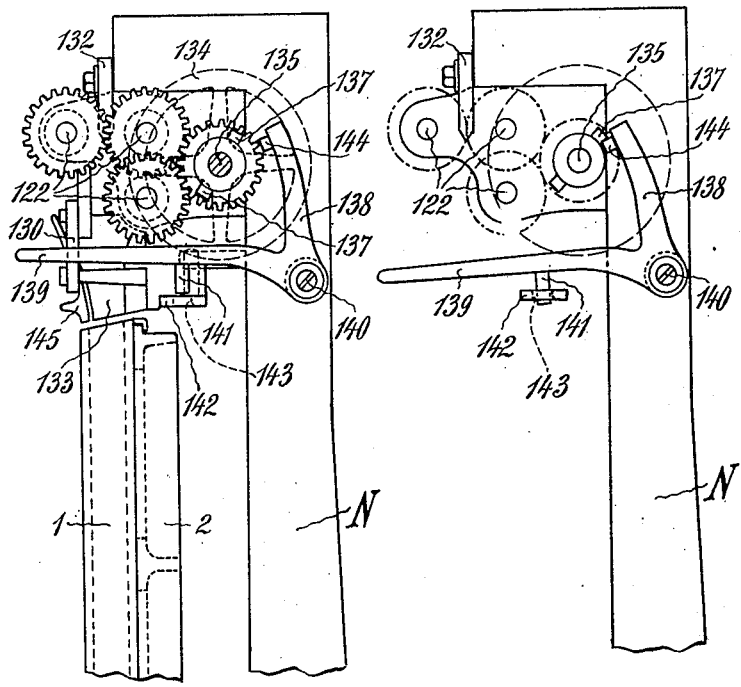

C. A. ALBRECHT & C. MUEHLEISEN.
LINOTYPE AND OTHER TYPE CASTING MACHINE.
APPLICATION FILED APR. 10, 1908.
913,447.
Patented Feb. 23, 1909.
9 SHEETS—SHEET 9.
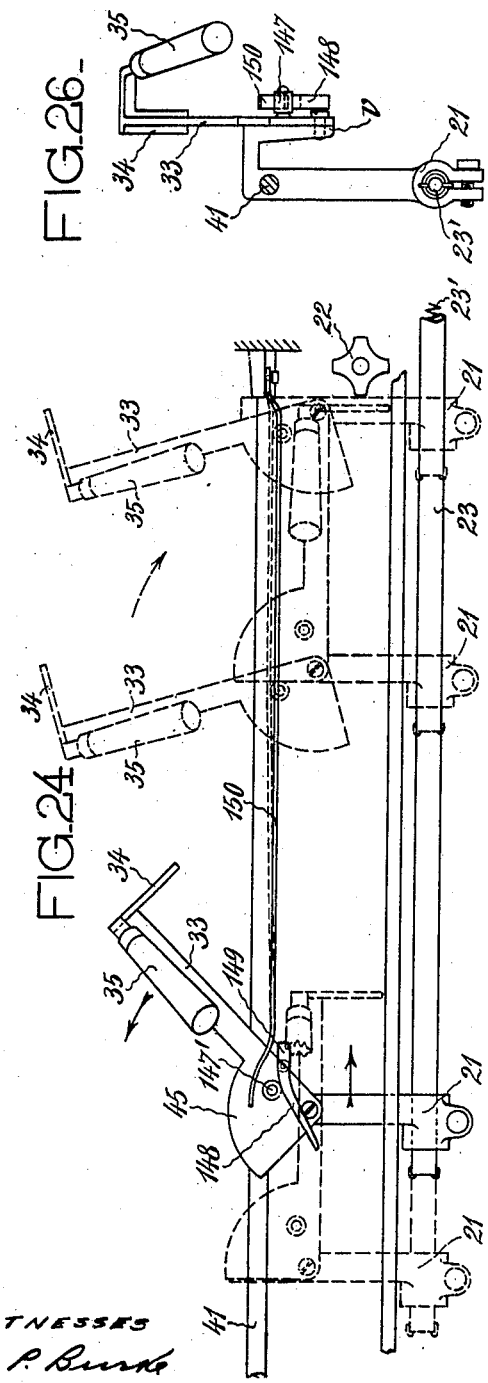
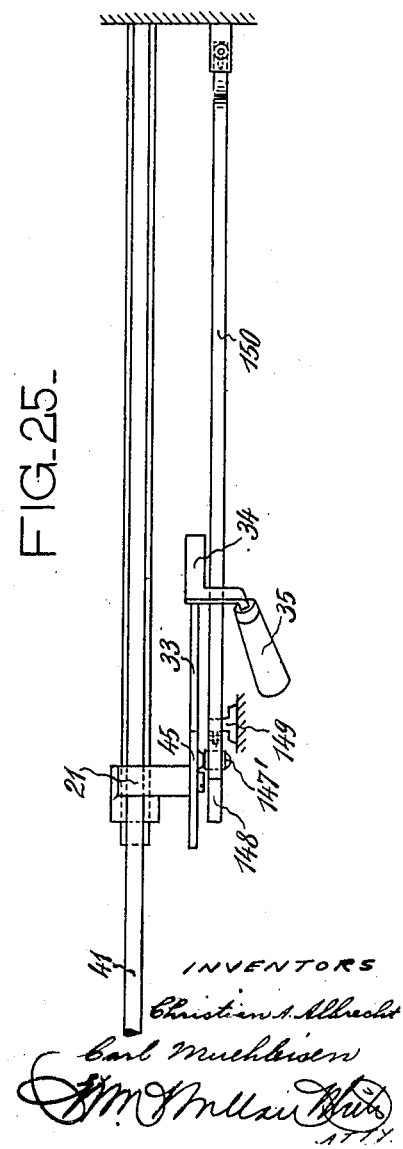

UNITED STATES PATENT OFFICE.

CHRISTIAN A. ALBRECHT, OF BALTIMORE, MARYLAND, AND CARL MUEHLEISEN, OF BERLIN, GERMANY.

LINOTYPE AND OTHER TYPE-CASTING MACHINE.

No. 913,447. Specification of Letters Patent. Patented Feb. 23, 1909.

Application filed April 10, 1908. Serial No. 426,383.

*To all whom it may concern:*

Be it known that we, CHRISTIAN A. ALBRECHT and CARL MUEHLEISEN, citizens of the United States, residing, respectively, at Baltimore, in the State of Maryland, and at Berlin, in the Kingdom of Prussia, Empire of Germany, have invented new and useful Improvements in Linotype and other Type-Casting Machines, of which the following is a specification.

Attempts have already been made to simplify and cheapen the well known Mergenthaler linotype-machine, and more particularly to reduce the space which it requires, by vertically placing its magazine. However this vertical disposition of the magazine alone does not suffice for rendering the linotype machine actually useful and in proportion cheap for the smaller and smallest printing-offices. Moreover this arrangement of the magazine presents the serious defect, that the distributing mechanism is placed so high as to excessively increase the difficulties in putting the machine in order in case of derangement.

Our invention relates to improvements in linotype-machines with vertical magazines, whereby the machine is rendered actually useful while the indicated defect is avoided.

The objects of our improvement are not only to reduce the size of the machine, but also to simplify all of its various mechanisms in order to render the price of the machine sufficiently low. The vertical magazine is lowered, so as to reduce the distance between its mouth and the upper part of the traveling belt serving for conveying the delivered matrices to the assembling mechanism. The said upper part of the traveling belt is only slightly inclined, so as to further reduce the height of the machine. In order to insure the correct order of succession, in which the various matrices delivered from the magazine under the action of the respective keys follow one another, the now shortened vertical channels are differently bent towards the assembling mechanism, the radius of their curvature being successively reduced from right to left, so as to cause the matrices from all the channels of the magazine to reach the assembling mechanism within the same space of time. Simple means are provided in place of the known complicated mechanisms for releasing the vertically movable yoke with the composed line of matrices and space bars and allowing it to drop, further for separating the matrices from the space bars, and for trimming the feet and the "burs" of the linotypes.

We will now proceed to describe our invention with reference to the accompanying drawings, in which—

Figure 1 is an elevation of the upper part of the improved linotype-machine, Fig. 1$^a$ is an elevation of the lower part of the same, a portion on the left being broken away and certain parts being shown in section, Fig. 2 is a vertical cross section through the same on the line E—F in Fig. 1 and on the broken line C—D in Fig. 1$^a$, seen from left to right, Fig. 3 is a side view of the vertical magazine and a part of the machine frame, Fig. 4 is a similar side view, in which the magazine occupies an inclined extreme position, Fig. 5 is a plan on a reduced scale of the driving gear and various mechanisms below, Fig. 6 is a part on an enlarged scale out of Fig. 1$^a$ and shows the assembling mechanism, the vertically movable yoke and part of the melting pot, Fig. 7 is a plan of the assembling mechanism shown in Fig. 6, Fig. 8 is a vertical cross section through the line A—B in Fig. 6, Fig. 9 is a plan of parts of the assembling mechanism in their normal position, Fig. 10 is a similar plan and shows the parts in their other extreme position, Fig. 11 is an elevation on a reduced scale of the left part of the linotype-machine, Fig. 12 is a side view of the same, when looked at from the left, Fig. 13 is a vertical cross section on an enlarged scale through the line G—H in Fig. 5 and shows the ejecting mechanism in one position, Fig. 14 is a vertical cross section on the same enlarged scale through the line I—K in Fig. 5 and shows knives for trimming the feet and "burs" of the linotype, Fig. 15 is a view similar to Fig. 13 and shows the parts of the ejecting mechanism in another position, Fig. 16 is a diagram and shows the mold and the mechanism for trimming the linotype in four different positions, the periphery of the actuating cam drum being developed, Fig. 17 is an elevation on an enlarged scale of the mechanism for separating the matrices from the space bars and for conveying them to the feeding screw-spindles along the distributer-rail, Fig. 18 is a similar view, certain parts occupying another position, Fig. 19 is a vertical cross section through the line L—M in Fig. 17 and shows a matrix, Fig. 20 is a similar section and shows a space bar, Fig. 21 is an elevation on a larger scale of the distributing mechanism, an intermediate part being omitted, Fig. 22 is a side view of the same, when looked at from the right, Fig. 23 is a similar view, in which a certain part occupies another position, Fig. 24 is an elevation on a larger scale of a modification of the assembling mechanism, Fig. 25 is a plan of the same, and Fig. 26 is a side view of the same, when looked at from the left.

Similar characters of reference refer to similar parts throughout the several views.

In the drawings we have illustrated our linotype-machine in a mode of execution, from which certain known mechanisms or devices are omitted.

The machine comprises a frame N of any convenient construction, in which a horizontal rod 4 (see Figs. 1 to 4) is secured. A supporting frame 2 is mounted on this rod 4 to rock, it being made adjustable vertically and horizontally by means of adjusting screws 5, 5 in lugs 3, 3 on the frame 2. A magazine 1 of any known and approved construction is made to hang on the top edge of the supporting frame 2 and is in any known manner prevented from horizontally shifting thereon, for example by means of a ledge on the said top edge engaging in a corresponding recess of the top projection of the magazine 1, as shown. The magazine 1 is made to normally bear by reason of its weight against horizontal pins 9, 9 provided on the machine frame N. Thereby the magazine 1 is held in its normal vertical position. Two horizontal studs $Z^1$, $Z^1$ are provided on the machine frame N on both sides of the magazine 1 and carry at their front ends a horizontal rail 7, against which the top of the magazine 1 is normally pressed by helical springs $Z^2$, $Z^2$ surrounding the studs $Z^1$, $Z^1$ with the aid of two arms 6 made in one piece with two handles 8, the long naves of which are turnable on the studs $Z^1$. The handles 8 and arms 6 operate in a manner similar to ordinary window-turns. When the handles 8 are turned downwards into their vertical position, their arms 6 will engage behind the magazine 1 for holding the latter in its normal position shown at Fig. 3. On turning the two handles 8 upward through a convenient angle, the magazine 1 will be set at liberty and can be tilted rearward, see Fig. 4. In this inclined position the magazine 1 can be secured by so turning the handles 8 as to cause their arms 6 to stop the magazine 1, as is clearly shown. The inclined position of the magazine 1 will greatly facilitate the internal cleaning of the magazine and the setting in order of various parts, if any derangement should occur.

The magazine 1 is provided with an escapement mechanism of any known construction and the lowermost matrices $m$ in the several channels are normally stopped by the escapement levers $n$ under the action of the springs 13 as usual. In the key-board O of any known construction the finger-keys are assumed to be arranged in six superposed rows (see Fig. 2) and the key levers 10, 10 belonging to the keys in the three lower rows are assumed to rock on a horizontal rod 15, while those belonging to the keys in the three upper rows are assumed to rock on another horizontal rod 14. All the key levers 10, 10 are made in one with upright arms 11, 11, which normally bear on the several escapement levers $n$ and can rock the same on their finger-keys being depressed for delivering the lowermost matrices $m$. This arrangement presents the advantage, that the magazine 1 can be at once removed and replaced by another one without any trouble or inconvenience. In Fig. 1$^a$ only a few key-levers 10 and arms 11 are shown, while a few others are shown in section. The key-board O is on one side provided with a special key-lever 16 (see Fig. 2) for delivering in a known manner by means of its vertical rod 16$^1$ (see Figs. 1 and 1$^a$) the lowermost space bar $s$.

In order to reduce the height of the linotype-machine we only slightly incline the upper part of the endless traveling belt 17, which serves for conveying the delivered matrices $m$ to the assembling mechanism. We further reduce the distance between the mouth of the magazine 1 and the said upper part of the belt 17, so that the ribs 18, 18 for guiding the matrices are made far shorter than in ordinary linotype-machines.

As the traveling belt 17 runs at a constant speed and the paths of the matrices from the mouths of the several magazine channels to the assembling mechanism greatly vary in length, there would be a danger that the matrices delivered from the magazine would not arrive at the assembling mechanism in the prescribed order of succession, the matrix leaving the remotest magazine channel arriving later than the following matrix delivered from any nearer magazine channel. In order to avoid this danger we bend the several ribs 18, 18 toward the assembling mechanism, that is to the left, in a varying manner, as is clearly shown in Figs. 1 and 1$^a$, so that their lower ends project the more to the left from the vertical lines of their upper ends, the nearer they are to the assembling mechanism. Thereby the speed of any matrix $m$ falling down the respective bent rib 18 is the more retarded by friction the nearer the rib 18 is to the assembling mechanism, so that the matrices delivered from the various magazine channels will severally practically arrive within the same space of time at the assembling mechanism. In this manner the prescribed order of succession of the matrices delivered from different magazine channels and arriving at the assembling mechanism is insured.

A horizontal rod 41 (see Figs. 1ᵃ and 6 to 12) is fastened in the machine frame N and parallel to it another rod 23 (Figs. 6, 8 and 24) in the same vertical plane is mounted in the machine frame N to longitudinally move. This rod 23 is constantly pressed by a helical spring 23¹ to the right in Figs. 1 and 1ᵃ and carries at its left end an arm 21 which at its upper end is guided by the rod 41 engaging in its eye. On the front of the arm 21 two parallel vertical rails $t\,t$ (see Figs. 1ᵃ, 6, 8 and 11) are placed horizontally and are fastened on the machine frame N in any convenient manner, for example by means of a support $u$ in Fig. 1ᵃ or the like. These rails $t\,t$ are parallel to the rod 23 and serve for guiding the matrices $m$ and space bars $s$ while being composed to form a line. At the right ends of the rails $t\,t$ in Fig. 1ᵃ a well known star wheel 22 is mounted to turn in the machine frame N and is driven by means of an endless belt and pulleys from the shaft of one pulley over which the traveling belt 17 passes, as is shown in dotted lines. A known inclined fixed plate 19 straddling the traveling belt 17 directs the dropping matrices $m$ and space bars $s$ downward over the star wheel 22 which erects them and pushes them to the left between the rails $t\,t$. The latter are provided at the end next to the star wheel 22 with slots 20 through which the composed line of matrices and space bars can be seen. The arm 21 mentioned above is at its upper end made in one piece with a cranked resistant $v$ (see Figs. 6 and 8, also 26), which extends downward between the two rails $t\,t$ and against which the composed line of matrices and space bars is advanced. To prevent the composed line from recoiling on the star wheel 22 presenting a tooth space to it, a pinching lever 25 (see Fig. 6) is mounted on the arm 21 to rock on a pin 40. This lever 25 has an oval eye (see Fig. 8), through which the rod 41 passes, and is pressed to the left by a helical spring 44. From an examination of Fig. 6 it will be clear that it is easy for the star wheel 22 to push the composed line of matrices $m$ and space bars $s$ forward to the left, since the spring 44 yields and permits the pinching lever 25 to turn a little upwards owing to the friction of its eye on the rod 41. When the composed line is released by the star wheel 22 presenting a tooth space to it, the arm 21 with the resistant $v$ will be instantaneously stopped by the lever 25 pinching the rod 41. Parallel to the rod 41 a short horizontal rod 30 is fastened in the machine frame N and on this rod 30 a bracket 31 can be longitudinally adjusted in accordance with the length of the line to be composed. This bracket 31 carries a signal bell 28 and a hammer 27 which is normally pressed on a pin shown by a helical spring 29 and has an arm 45. On the upper part of the resistant $v$ is a pin $w$ on which a three-armed lever 36, 37, 38 is mounted to rock in a horizontal plane (see Figs. 9 and 10). One arm 38 carries an adjustable screw 39 which is adapted to bear on the upper end of the pinching lever 25. It will be seen, that on turning the lever 38 in the direction of the hands of a clock in Fig. 9 the adjustable screw 39 will bring the pinching lever 25 into its vertical position (see Fig. 10) for releasing the rod 41 and permitting the rod 23 with the arm 21 and resistant $v$ to return to their initial position. On the free end of the arm 37 is a pin, on which a bent lever 24, 43 is mounted to rock in a horizontal plane. The vertical arm 21 has on its top a projection 47 which is connected with the smaller arm 43 of the bent lever 24, 43 by a helical spring 42 and is provided with a hole for guiding the end of the larger arm 24. This end of the arm 24 is on the right in Figs. 9 and 10 so cut out as to form a shoulder which can snap behind and bear on the projection 47 on the three-armed lever 36, 37, 38 being turned in the direction of the hands of a clock, see Fig. 10. On the rod 30 is a stop 147, see Figs. 6 and 7, which is in the path of the arm 24.

It will now be understood, that when the rod 23 with the arm 21 and the various parts thereon is permitted to return to its initial position on the right in Fig. 1ᵃ, the stop 147 will strike the arm 24 and press it against the left inside of the hole in the projection 47, whereupon the helical spring 42 will pull the bent lever 43, 24 rearward and thus turn the three-armed lever 36, 37, 38 into the normal position shown at Fig. 9, in which the pinching lever 25 is released and permitted to pinch the rod 41 under the action of the spring 44. The projecting reduced end of the arm 24 of the bent lever 24, 43 is in its normal position adapted to strike the arm 26 of the hammer (see Fig. 6) and to raise the same and thereby turn the latter, until it strikes the adjustable bracket 31 and releases the arm 26, whereupon under the action of the spring 29 the hammer 27 strikes the signal bell 28, so that the latter sounds and announces to the operator, that the adjusted length of the line to be composed has been nearly reached. The arm 26 of the hammer 27 will then snap behind the projecting reduced end of the arm 24 and thereby prevent the rod 23 with the arm 21 and all the parts thereon from shifting, until the three-armed lever 36, 37, 38 is turned in the direction of the hands of a clock in Fig. 10 and thus the projecting reduced end of the arm 24 is withdrawn so that it can not strike the arm 26 nor the bracket 31. This turning of the three-armed lever 36, 37, 38 is effected in the following manner: On the resistant $v$ an operating lever 33 is mounted to rock in a vertical plane and this lever 33 is provided with a handle 35 (see Figs. 1ª, 6, 7, 8, and also 24 to 26), a hook 34 and a segment 45. The arm 36 of the three-armed lever 36, 37, 38 is shaped in a manner clearly shown at Fig. 10, its end being bent towards the arm 37 and leaving a narrow passage through which the operating lever 33 and the segment 45 can pass. Between the two arms 36 and 37 ample space is left to the operating lever 33 (see Fig. 9) in its normal position shown at Fig. 1ª, in which the operating lever 33 bears against the rear side of the arm 36 and the segment 45 is beneath the arm 36. The hook 34 is at right angles to the operating lever 33 and is adapted to engage behind the last matrix $m$ of the composed line, while the operating lever 33 may engage in the known upper triangular cuts in the matrices $m$ and space bars $s$, as is clearly shown at Fig. 6. When the operating lever 33 occupies its normal inclined position shown at Fig. 1ª, it bears against the left inside of the space between the two arms 36 and 37 and is there prevented from turning downwards on the left. On the signal bell 28 sounding the operator turns by means of the handle 35 the operating lever 33 downwards in the direction of the dotted arrow in Fig. 24, so that first the operating lever 33 sliding in the slot between the two arms 36 and 37 and passing through the narrow passage shown at Fig. 10 will turn the three-armed lever 36, 37, 38 and afterward the segment 45 will engage in and pass through the said passage and prevent the three-armed lever 36, 37, 38 from shifting. The operator can then move by means of the handle 35 and the hook 34 the composed line between the two rails $t\,t$ to the left in the direction of the arrow shown in Fig. 6 while straining the tension of the helical spring 23¹. In this manner the composed line of matrices $m$ and space bars $s$ is transferred to the vertically movable yoke 32 to be presently described. It is obvious that during the return of the operating lever 33 with the arm 21 and the rod 23 from left to right it is possible for the operator to turn meanwhile the operating lever 33 back to its normal position before the arm 21 reaches its initial position since the shoulder of the arm 24 bearing on the projection 47 prevents the three-armed lever 36, 37, 38 from shifting, so that the projecting reduced end of the arm 24 can not strike the arm 26 of the hammer 27. It may be that the operator forgets to turn the operating lever 33 upward before reaching the end of the path of the arm 21. For this reason it may be preferable (although it is not absolutely necessary) to effect the turning upward of the operating lever 33 in an automatical manner as follows: On the segment 45 is fastened a pin, on which a roller 147¹ is mounted to turn, see Figs. 24 to 26. On the machine frame N is fastened a projection 149, to which a cam 148 is so hinged, that it is permitted to turn upward but is prevented from turning downward from its normal position shown in Fig. 24. On the operating lever 33 with the yielding resistant $v$ and the composed line being moved to the left, the roller 147¹ will strike the cam 148 and turn it upward, whereby the further movement to the left is permitted. On the return of the yielding resistant $v$ from left to right the cam 148 will strike the roller 147¹ and thereby turn the operating lever 33 upward, in the direction of the full arrow in Fig. 24, into a vertical position or nearly so. On the machine frame N is further fastened a long leaf spring 150, the left free end of which is bent in the manner shown at Fig. 24. It will be seen that during the return from left to right of the arm 21 the bent end of the leaf spring 150 will strike the roller 147¹ and push it to the left and thus move the operating lever 33 a little beyond its vertical position until the roller 147¹ leaves the projection 149 and is now pressed downward by the straight part of the leaf spring 150, thus turning the operating lever 33 into its initial position.

In the machine frame N are fastened two vertical rods 108 and 109 (see Figs. 1, 1ª, 6, 11 and 12) for guiding the vertically movable yoke 32 by means of a sleeve 50 and ear 32¹ respectively. The yoke 32 may be of any known construction, the essential point being that it is adapted to receive the composed line of matrices $m$ and space bars $s$ and to present the intaglio letters of the same to the mouth of a mold 82 (see Fig. 2) to be described later on. The yoke 32 is suspended from a rope 99, which extends upward and passes over one of two pulleys 100 (see Figs. 11 and 12) downward, then round one of two pulleys 101 again upward, next over the other pulley 100 downward and at last round the other pulley 101 upward, where its other end is attached to a helical spring 102, which in turn is attached to a hook 103 on the machine frame N. The two upper pulleys 100 are mounted to turn separately on a pin secured on the machine frame. The two lower pulleys 101 are in a similar manner independently turnable on a pin at the upper free end of a cranked lever 104, which is rigidly connected with a second cranked lever 115 by means of a long sleeve or nave 106 loose on an axle 106¹ secured in the machine frame N. A horizontal shaft 71 is mounted in the machine frame to turn and carries a cam disk 79, which is adapted to actuate a roller 107 at the free end of the cranked lever 115. The shaft 71 is in a manner to be described later on periodically set in motion to make a single complete revolution in the direction of the hands of a clock in Fig. 12. In the normal position of the parts shown in full lines in Fig. 12 the vertically movable yoke 32 registers with the two rails $t\,t$, so that it is adapted to receive the composed line. The yoke 32 is kept in this normal position by a spring-pressed pawl 48 which hangs on some pin 49 (see Fig. 6) or other projection on the rails $tt$. The upper horizontal part of the operating lever 33 adjoining the handle 35 (see Fig. 26) is adapted to strike the spring-pressed pawl 48, whereby the yoke 32 is released and allowed to drop. This is permitted by the shape of the cam disk 79 as will be clear after an examination of Fig. 12. The short path of the two pulleys 101 permitted by the recess in the periphery of the cam disk 79 is multiplied by the four strings carrying them, so that the path of the yoke 32 is four times as great and the yoke 32 at the end of its descent will be opposite to the mold 82 (see Figs. 1ᵃ and 2.) At this moment the roller 107 will bear on the part of the periphery of the cam disk 79 which is nearest to the shaft 71. When during the revolution of the latter the cam disk 79 depresses the roller 107 the yoke 32 will be thereby raised to its highest position, indicated by the dotted lines in Fig. 12, in which position it registers with the upper rails $x$ (see Figs. 1 and 11) leading to the distributing mechanism. On the roller 107 leaving the part of the cam disk 79 remotest from the shaft 71 and running on the lower part shown of same in Fig. 12 the yoke 32 will be again lowered into its normal position shown at Fig. 1ᵃ in which its spring-pressed pawl 48 engages the pin 49 or the like on the rails $tt$. At this moment the roller 107 will have left the point on the cam disk 79, as is shown at Fig. 12, and the shaft 71 will stop.

On the machine frame N a horizontal rail 84 (see Figs. 1ᵃ and 2) is mounted to rock around a vertical pin 84¹ on the right (see Fig. 5) while its left free end is guided in the machine frame. On the rail 84 a slide 83 is mounted to reciprocate and this slide 83 carries a mold 82, which in its normal position presents its cavity to the mouth of a melting-pot 73. The latter may be of any known construction and is in any known manner guided in the machine frame in the cross direction. A cam disk 72 is fastened on the shaft 71 and is adapted to horizontally reciprocate the melting-pot 73 by means of suitable parts as shown in Fig. 5. On a pin in the machine frame N a lever 75 (see Figs. 2 and 5) is mounted to vertically rock, which is pivotally connected with a vertical rod 75¹ hinged to the piston 73¹ of the melting pot 73, and is permanently pressed downwards by a helical spring 76. In about its middle the lever 75 carries a roller which is adapted to roll on the periphery of a cam disk 74 fastened on the shaft 71. The slide 83 above mentioned is pivotally connected by means of a link 87 (see Fig. 16) with a cranked lever 85 (Fig. 2) which is fulcrumed on the machine frame at 86 and carries a roller 88 that engages in the cam groove 78 on a drum 77 fastened on the shaft 71. In Fig. 16 the periphery of the drum 77 is developed, so that the shape of the cam groove 78 can be seen and also the manner in which it by means of the roller 88 and lever 85 operates the slide 83 with the mold 82. On the rail 84 is fastened a bent bracket 84¹ (see Fig. 14) carrying knives 90, 90¹ and 91, of which the rear knife 91 is adapted to trim the foot of the cast linotype during the movement of the slide 83 from left to right, while the two front knives 90 and 90¹ are adapted to trim the "burs" during the movement of the slide 83 from right to left. From an examination of Fig. 5 it will be evident, that on the slide 83 being pulled from left to right by the lever 85, the link 87 working eccentrically on the rail 84 will turn the latter a little rearward so as to withdraw the mouth of the mold 82 from the composed line of matrices and space bars and thus to release the yoke 32, which is then permitted to rise.

As is shown at Figs. 13 and 15, an ejector 89 is fastened on a slide 93, which is horizontally guided in the machine frame N (see Fig. 5) and is pivotally connected with a rod 94, the rear end of which carries a roller 97 and is suspended from some pin 95 on the machine frame by means of a link 96 and is connected with a helical spring 98 attached to the machine frame. The spring 98 tends to press the roller 97 on the periphery of a cam disk 92 fastened on the shaft 71. The cam disk 92 has two distinct cams 92ᵃ and 92ᵇ of different maximum radiuses, as shown in Figs. 13 and 15. The lower cam 92ᵃ is adapted to push the ejector 89 only so much that the linotype projects a little on the front from the mold 82 as is shown at Fig. 13, and the higher cam 92ᵇ is adapted to push the ejector so far as to completely eject the linotype, as is shown at Fig. 15.

A cranked lever 112 (see Figs. 1, 1ᵃ, 11 and 12) is mounted in the machine frame N to rock and is rigidly connected with an arm carrying a roller 111, which normally bears on the periphery of a cam disk 80 fastened on the shaft 71. A horizontal rod 110 fastened above in the machine frame N serves for guiding a slide 81¹ which is pivotally connected with the upper end of the lever 112 by means of a link 113. The slide 81¹ carries a pusher 81 which projects upwards in the vertical central plane of the two rails $x$ and is adapted to push the composed line from the yoke 32 to the rails $x$. Some known means such as a spring etc. (not shown) are provided for pressing the roller 111 on the cam disk 80 and pressing the pusher 81 from left to right in Fig. 11.

In a similar manner to known machines the yoke 32 is adapted to set the shaft 71 to rotate in the following manner: A shaft 52 (see Fig. 1ª) is mounted in the machine frame N to rock and carries two arms 51 and 53, of which the arm 51 is bent upward and engages in the path of the sleeve 50 of the yoke 32, while the other arm 53 (see also Fig. 5) is pivotally connected with a lever 54, the right free end of which normally bears on a lug 56 that is provided on a gear wheel 55 (see Fig. 2) fastened on the shaft 71. The right end of the lever 54 is further pivotally connected by a rod 57 with a weighted horizontal arm 58 fastened on a horizontal shaft 59 which is mounted in the machine frame to rock. A horizontal shaft 61 parallel to the shaft 71 is mounted in the machine frame N to turn and has fastened on it a pinion 61¹ meshing with the gear wheel 55 and two parallel arms 65 between which a brake 69 is radially guided and on which a bent lever 64, 66 is mounted to rock. The short arm 66 is pivotally connected with the shank of the brake 69, which shank is connected with the nave of the two arms 65 by means of a helical spring 70. Loose on the shaft 61 is a driving pulley 68, which is made in one piece with a rim 67 that on its outside serves as another driving pulley and on its inside serves as a brake rim. Either of the two pulleys 67, 68 is constantly driven from without. Fastened on the shaft 59 below is a vertical arm 60 carrying an eye 62 which surrounds the shaft 61 and is adapted to press on a roller 63 provided at the lower end of the long arm 64 of the bent lever 64, 66. When the yoke 32 is released and allowed to drop, its sleeve 50 will strike the end of the arm 51 and withdraw by means of the parts 52 and 53 the right end of the lever 54 from the lug 56 on the gear wheel 55, whereupon the weight 58¹ on the arm 58 will pull the parts 57 and 54 downward and press the arm 60 with the ring 62 on the roller 63, whereby the brake 69 is pressed on the inside of the rim 67 and the latter is thus connected by friction with the shaft 61 which is therefore set to rotate and to drive the shaft 71 by means of the pinion 61¹ and the gear wheel 55. On the shaft 71 completing one revolution the lug 56 on the gear wheel 55 will strike the free right end of the lever 54 and raise the latter with the rod 57 and the weighted arm 58, so that the spring 70 will pull inward the brake 69 and thus disconnect the shaft 61 from the driving pulleys 67, 68 when the shaft 71 with all the parts on it will stop. By shifting the weight 58¹ on the arm 58 the pressure of the brake 69 on the inside of the rim 67 can be regulated. That pulley 67 or 68 which is not driven from without is adapted to drive by an endless belt 151 (see Fig. 2) a pulley on an intermediate shaft 152, from which the power is transmitted to the traveling belt 17 by means of an endless rope 153 and suitable pulleys, and further by means of another endless rope 154 to the driving pulley 134 on a shaft 135 serving for driving the distributing mechanism, that is to say three feeding screw-spindles 122, 122 by means of a suitable gearing.

The distributing mechanism may be essentially of any known construction and we will only point out the new features of our invention.

Adjoining the rails $x$ mentioned above are two parallel rails 117, 117, with reduced parts 123 above and one rail 155 parallel to the first two below (see Figs. 17 to 20), of which the upper ones extend to a point beyond the left end of the distributer-rail 132 and are provided with detaining shoulders 114, while the lower rail 155 is only as long as the rails 117, 117 and has a shoulder 115. Against the shoulders 114, 114 and 115 three lugs of the last matrix $m$ or space bar $s$ on the right in the composed line are pressed by the pusher 81. The parts 123 of the rails 117, 117 on the right side of the detaining shoulder 114 are made a little lower than the rails 117, 117 and are adapted to guide the upper lugs of both the matrices $m$ and the space bars $s$, so that the matrices can engage in the teeth of the distributer-rail 132. As is clearly shown at Figs. 19 and 20, the lugs of the space bars $s$ are made as large as those of the matrices $m$, so that they can slide on the rails 117, 123, while they are made higher and provided at their upper external corners with pins for a purpose to be presently described. The separation of the several matrices and space bars from the line is effected in a known manner by means of a pair of separators 116, 116, which are suspended from a crosshead at the free end of the horizontal arm of a bent lever 119 and are connected together in their middle by means of a rod 116¹, while their lower ends are hooked and guided in vertical grooves 118, 118 provided on the outsides of the two rails 117, 117. Parallel to the rails 117, 117 a shaft 125 is mounted in the machine frame N to turn and is driven from the driving shaft 135 (see Figs. 1 and 22) in any known manner, or it may be in one piece with the shaft 135. It carries at its left end two cams 120 and 126 of which one 120 is adapted to strike a roller at the lower end of the pendent arm of the bent lever 119, while the other cam 126 is adapted to strike a roller at the free end of a lever 156 (Fig. 17). The lever 156 is by its shaft rigidly connected with a second lever 157 (Fig. 18) in the common plane, which lever with its reduced end engages in an eye at the left upwardly bent end of a plate 124 that slides on the top surfaces of the upper lugs of the composed line, as is clearly shown. The lever 157 is constantly pressed from left to right by a helical spring 127 attached to the machine frame. It will be understood, that on the cam 126 striking the corresponding roller the levers 156 and 157 will be turned to the left, while on the roller being released the spring 127 will recoil and move the plate 124 to the right. The horizontal arm of the bent lever 119 is constantly pressed upward by a helical spring 121 connecting its pendent arm with a suitable pin on the machine frame N. The two separators 116, 116 may be connected with the lever 119 by an inclined helical spring as shown and are adapted to strike from below parts of the upper lugs of each matrix m and space bar s and to lift them above the detaining shoulders 114, 114, whereupon the plate 124 according to our invention will throw them to the right, so that they will quickly leave space to the next following matrix m or space bar s to be separated. Thus every derangement or blocking up is avoided as much as possible. The several matrices and space bars separated and thrown to the right can readily engage in the square threads of the feeding screw-spindles 122, 122. Every matrix m is thereby caused to engage the teeth of the distributer-rail 132, while every space bar s will strike with its lower end the bent wall at the upper ends of the two known guides 128 and on its lugs leaving the reduced parts 123 of the rails 117, 117 and engaging in a known manner in the two guides 128, the space bar s will slide down the guides 128 and hang downwards on the lower bent ends of the latter, as is shown at Fig. 1. Here they are stopped by known detaining shoulders at the ends of the guides 128 and they can be delivered one after the other in the known manner by means of the special key-lever 16 and rod 16¹ already mentioned above, they being severally lifted over the detaining shoulders and allowed to fall down the cover above the left pulley of the traveling belt 17 and over the inclined plate 19 between the star wheel 22 and the last matrix of the line being composed.

Between the top of the magazine 1 on the one hand and the distributer-rail 132 and the feeding screw-spindles 122, 122 on the other hand a movable bar 129 (see Figs. 1, 2 and 21) is disposed, which at its ends is suspended from the machine frame N by means of links 130, 130, so that it is permitted to longitudinally move. The bar 129 is on the front provided with a series of vertical ribs 133, 133 which correspond with the ribs 131, 131 on the insides of the magazine 1 and serve for guiding the matrices dropping from the distributer-rail 132 and for conducting them to the channels of the magazine. The spaces between the ribs 133, 133 are on the front closed by a curved plate 145 (see Figs. 2 to 4) which is hinged at 146 on the rail 7 and can be turned downward for inspecting the channels between the ribs 133, 133. The bar 129 is pressed from right to left into its normal position shown at Fig. 21 by a helical spring 158. It is provided on its right end with a horizontal extension 142 having a hole 143. On the machine frame N is a pin 140 (see Figs. 22 and 23), on which a bent lever 138, 139 is mounted to rock in a vertical plane at right angles to the shaft 135. The horizontal arm 139 of this lever has a pin 141, which normally bears on the extension 142 and can engage in the hole 143 on the bar 129 being shifted to the right. The driving pulley 134 is loose on the shaft 135 and is yieldingly connected with the latter by means of a friction clutch 136 of any known construction. The pulley 134 is constantly driven and is permitted to turn on the shaft 135 should the latter be stopped either from any of the screw-spindles 122, 122, or by means of the friction clutch 136, in case the bar 129 is shifted to the right in Fig. 21, which is effected as follows: The friction clutch 136 is provided with two opposite pins 137, 137, which normally move past a pin 144 provided on the upper arm 138 of the bent lever 138, 138, since the horizontal arm of the latter is supported by the extension 142. Should any matrix get wedged between any two ribs 133, 133 and be moved further to the right by the rotating screw-spindle 122, 122, it will take along with it the bar 129, so that the pin 141 on the dropping arm 139 will engage in the hole 143 of the extension 142 and the pin 144 on the upper arm 138 will engage in the path of the pins 137, 137 and stop either of them and thereby the friction clutch 136 with the shaft 135, as is shown at Fig. 23.

The linotype-machine described operates as follows: The bracket 31 (Fig. 6) is adjusted on the rod 30 in accordance with the desired length of the linotype to be produced. The operator then depresses the several keys of the key-board O in accordance with the manuscript etc., for delivering the respective matrices m from the magazine and the space bars s from the lower ends of the guides 128. The star wheel 22 pushes the matrices and space bars against the yielding resistant v forward to the left between the rails t t while overcoming the tension of the helical spring 23¹. The projecting reduced end of the lever 24 after having caused the signal bell 28 to sound by striking and releasing the arm 26 will strike the bracket 31 and stop the resistant v whereupon the operator turns the operating lever 33 downwards by means of its handle 35, so that the hook 34 engages behind the last matrix m of the composed line and the operating lever 33 turns the three-armed lever 36, 37, 38 into its extreme position shown at Fig. 10. Thereby the pinching lever 25 is disconnected from the rod 41 and the composed line is set at liberty. Now the operator moves by means of the handle 35 and the operating lever 33 the composed line to the left for transferring the latter to the vertically movable yoke 32, the extreme position being indicated by the dotted lines in Fig. 6. At the moment that the part between the operating lever 33 and the handle 35 strikes the spring-pressed pawl 48, the latter will be pushed off its support 49, so that the yoke 32 now liberated will drop into its lowermost position while pulling upwards the lever 104 by means of the rope 99 until the roller 107 on the lever 115 strikes the cam disk 79. The composed line is then justified by means of any known device, the space bars s being driven upward. The sleeve 50 of the dropping yoke 32 has struck the lever 51 for setting the shaft 71 to rotate in the manner described above. The intaglio letters of the composed line are now opposite to the mouth of the mold 82 and the cam disk 72 rotating will push the mouth of the melting pot 73 against the mold 82 and thereby the latter against the composed line while turning the rail 84 a little to the front. Next the cam disk 74 releases the roller on the lever 75, so that the helical spring 76 by means of the lever 75 and the rod 75¹ drives downwards the piston 73¹ for forcing the molten metal into the mold 82, whereupon the cam disk 74 again strikes the roller on the lever 75 for raising the latter with the piston 73¹. Afterwards the cam disk 72 withdraws the melting-pot 73 and the cam groove 78 on the drum 77 will by means of the parts 88, 85, 87 and 83 shift the mold 82 from the position I to the position II shown at Fig. 16 while turning a little rearwards the rail 84 to withdraw the top of the cast linotype from the intaglio letters of the composed line. During the movement of the slide 83 along the rail 84 the rear knife 91 will have trimmed the foot of the linotype. Meanwhile the yoke 32 with the composed line has been raised into its uppermost position by the cam disk 79 in the manner described above. Thereupon the cam disk 80 will release the roller 111, so that the respective spring (not shown) will actuate the parts 112 and 113 for pushing by means of the pusher 81 the composed line from the yoke 32 to the rails x, 117 against the detaining shoulders 114, 115. Afterwards the yoke 32 descends and returns to its initial position. Meantime the cam 92ª on the cam disk 92 will by the parts 97, 94 and 93 push the ejector 89 into the mold 82, but only so much, that the linotype projects a little from the mold 82, as is shown at Fig. 13. Thereupon the ejector 89 is withdrawn from the mold 82 and the cam groove 78 on the drum 77 will cause the mold 82 to be shifted from the position II to the other one III shown at Fig. 16, so that during this movement the front knives 90, 90¹ will have trimmed the "burs" of the linotype, whereupon the mold 82 is shifted back from the position III to that IV and the larger cam 92ᵇ on the cam disk 92 causes the ejector 89 to eject the finished linotype (see Fig. 15) from the mold 82 to some galley not shown. On the ejector 89 withdrawing from the mold 82, the latter is returned to its initial position, whereupon the shaft 71 completes its single revolution and is stopped in the manner described above. The lever 112 will by this time have been returned to its initial position.

As already mentioned in the introductory part of this specification our machine is provided with further mechanisms or devices for accomplishing its work satisfactorily, which mechanisms or devices are not described here, as they are known and form no part of our invention.

The linotype-machine described may be varied in many respects without departing from the principle of our invention.

We claim:

1. In linotype and other type casting machines, the combination with a vertical magazine, of a traveling belt having its upper part slightly inclined at a short distance from the mouth of said magazine, an assembling mechanism adjoining the delivery of said traveling belt, and a plurality of ribs between said magazine and the upper part of said traveling belt for guiding the delivered matrices, said ribs being bent towards said assembling mechanism and the lower end of each rib projecting the more from the vertical line of its upper end the nearer the rib is to the assembling mechanism, so as to insure the prescribed order of succession of the matrices arriving at the assembling mechanism.

2. In linotype and other type casting machines, the combination with a pair of rails adapted to guide the matrices and space bars while being composed to form a line, of a yoke vertically movable in the machine frame and adapted to receive from said pair of rails the composed line and to present it in a lower position to the mold, and means for transferring the composed line from said pair of rails to said yoke, means for holding said yoke in proper position to receive the composed line and means for automatically releasing the yoke and allowing it to drop into the casting position.

3. In linotype and other type casting machines, the combination with a pair of rails adapted to guide the matrices and space bars while being composed to form a line, of a yoke vertically movable in the machine frame and adapted to receive from said pair of rails the composed line and to present it in a lower position to the mold, a latch in said yoke to prevent it from dropping, and means for transferring the composed line from said pair of rails to said yoke while striking said latch, whereby said yoke is released and allowed to drop into the casting position.

4. In linotype and other type casting machines, the combination with a pair of rails adapted to guide the matrices and space bars while being composed to form a line, of a yielding resistant against which the matrices and space bars are advanced, a yoke vertically movable in the machine frame and adapted to receive from said pair of rails the composed line and to present it in a lower position to the mold, and means on said yielding resistant for transferring the composed line from said pair of rails to said yoke, means for holding said yoke in proper position to receive the composed line, and means for automatically releasing the yoke and allowing it to drop into the casting position.

5. In linotype and other type casting machines, the combination with a pair of rails adapted to guide the matrices and space bars while being composed to form a line, of a yielding resistant against which the matrices and space bars are advanced, a yoke vertically movable in the machine frame and adapted to receive from said pair of rails the composed line and to present it in a lower position to the mold, means for preventing said yielding resistant from recoiling during its advance, an operating lever on said yielding resistant and adapted to transfer the composed line from said pair of rails to said yoke, means for holding said yoke in proper position to receive the composed line, and means for automatically releasing the yoke and allowing it to drop into the casting position, and means on said yielding resistant and controlled by said operating lever for releasing the former and permitting it to return.

6. In linotype and other type casting machines, the combination with a pair of rails adapted to guide the matrices and space bars while being composed to form a line, of a yielding resistant against which the matrices and space bars are advanced, a yoke vertically movable in the machine frame and adapted to receive from said pair of rails the composed line, a braking lever on said yielding resistant for normally preventing it from recoiling during its advance, an adjustable stop on the machine frame for limiting the length of the line to be composed, a part rocking on said yielding resistant and controlling said braking lever, a spring tending to turn said part in one direction, a bolt on said part and adapted to strike in its normal position said adjustable stop, and an operating lever turnable on said yielding resistant and adapted on being turned into another position to engage the last matrix composed for transferring the composed line to said yoke while turning said part in the opposite direction to withdraw said bolt and render inoperative said braking lever.

7. In linotype and other type casting machines, the combination with a pair of rails adapted to guide the matrices and space bars while being composed to form a line, of a yielding resistant against which the matrices and space bars are advanced, a yoke vertically movable in the machine frame and adapted to receive from said pair of rails the composed line and to present it in a lower position to the mold, a latch in said yoke to prevent it from dropping, a braking lever on said yielding resistant for normally preventing it from recoiling during its advance, an adjustable stop on the machine frame for limiting the length of the line to be composed, a part rocking on said yielding resistant and controlling said braking lever, a spring tending to turn said part in one direction, a bolt on said part and adapted to strike in its normal position said adjustable stop, and an operating lever turnable on said yielding resistant and adapted on being turned into another position to engage the last matrix for transferring the composed line to said yoke while turning said part in the opposite direction to withdraw said bolt and render inoperative said braking lever, it being adapted to strike said latch for releasing said yoke and permitting same to drop into the casting position.

8. In linotype and other type casting machines, the combination with the yielding resistant $v$, of the braking lever 25 for preventing the resistant $v$ from recoiling during its advance, the adjustable stop 31 for limiting the length of the line to be composed, the three-armed lever 36, 37, 38 rocking on the resistant $v$ and controlling by means of its arm 38 the braking lever 25, the bolt 24 on the arm 37 adapted to strike the adjustable stop 31, and the operating lever 33 adapted on being turned to engage with its hook 34 the last matrix composed for transferring the composed line to the vertically movable yoke 32 while turning the three-armed lever 36, 37, 38 by means of its arm 36 to withdraw the bolt 24 from the stop 31 and render inoperative the braking lever 25.

9. In linotype and other type casting machines, the combination with the pair of rails $t\ t$ for guiding the matrices and space bars while being composed to form a line, the yielding resistant $v$, the vertically movable yoke 32 with the latch 48 to prevent it from dropping, the operating lever 33 adapted on being turned to engage with its hook 34 the last matrix and the handle 35 adapted to transfer the composed line from the rails $t\ t$ to the yoke 32 while striking the latch 48 to release the yoke 32 and permit it to drop into the casting position.

10. In linotype and other type casting machines, the combination with the yielding resistant $v$, of the braking lever 25, the adjustable stop 31, the three-armed lever 36, 37, 38 rocking on the resistant $v$ and controlling with its arm 38 the braking lever 25, the bolt 24 on the arm 37 adapted to strike the adjustable stop 31, and the operating lever 33 provided with the segment 45 and adapted on being turned to engage with its hook 34 the last matrix composed for transferring the composed line to the vertically movable yoke 32 while turning the three-armed lever 36, 37, 38 by means of the arm 36 to withdraw the bolt 24 from the stop 31 and render inoperative the braking lever 25, the segment 45 engaging in the narrow passage between the two arms 36 and 37.

11. In linotype and other type casting machines, the combination with the yielding resistant $v$ provided with the guide 47, of the adjustable stop 31, the lever 37 rocking on the resistant $v$, the spring-pressed bolt 24 rocking on the lever 37 and guided in the guide 47 and adapted to strike in its normal position the adjustable stop 31 and to turn on being withdrawn therefrom and to bear with a shoulder on the guide 47, means for turning the lever 37 to withdraw the bolt 24 for transferring the composed line to the vertically movable yoke 32, and the stop 147 adapted to strike and release the withdrawn bolt 24 on the resistant $v$ returning to its initial position.

12. In linotype and other type casting machines, the combination with a pair of rails adapted to guide the matrices and space bars while being composed to form a line, of a yielding resistant against which the matrices and space bars are advanced, a yoke vertically movable in the machine frame and adapted to receive from said pair of rails the composed line, an operating lever mounted on said resistant to turn in a vertical plane and adapted on being turned downwards to engage the last matrix composed for transferring the composed line to said yoke, and means for automatically turning upwards said operating lever during the return of said resistant to its initial position.

13. In linotype and other type casting machines, the combination with a pair of rails adapted to guide the matrices and space bars while being composed to form a line, of a yielding resistant against which the matrices and space bars are advanced, a yoke vertically movable in the machine frame and adapted to receive from said pair of rails the composed line, an operating lever mounted on said resistant to turn in a vertical plane and adapted on being turned downwards to engage the last matrix composed for transferring the composed line to said yoke, a roller on said operating lever, and a cam on the machine frame and adapted to turn upwards on being struck and raised by said roller during the movement of said resistant with said operating lever to said yoke and to strike said roller and thereby turn upwards said operating lever during the return of said resistant to its initial position.

14. In linotype and other type casting machines, the combination with a pair of rails adapted to guide the matrices and space bars while being composed to form a line, of a yielding resistant against which the matrices and space bars are advanced, a yoke vertically movable in the machine frame and adapted to receive from said pair of rails the composed line, an operating lever mounted on said resistant to turn in a vertical plane and adapted on being turned downwards to engage the last matrix composed for transferring the composed line to said yoke, a roller on said operating lever, a cam on the machine frame and adapted to turn upwards on being struck and raised by said roller during the movement of said resistant with said operating lever to said yoke and to strike said roller and thereby turn upwards said operating lever into a nearly vertical position during the return of said resistant to its initial position, and a leaf spring fastened on the machine frame and adapted to actuate said roller and thereby turn said operating lever to its initial position.

15. In linotype and other type casting machines, the combination with the yielding resistant $v$, of the operating lever 33 thereon and adapted to be turned downwards for engaging the last matrix composed, the handle 35 for moving the operating lever 33 with the resistant $v$ and the composed line forward to the vertically movable yoke 32, the roller 147 on the operating lever 33 and the cam 148 hinged to the machine frame and adapted to be turned by the roller 147 during the forward movement and to strike same and thereby turn upwards the operating lever 33 during the return.

16. In linotype and other type casting machines, the combination with the yielding resistant $v$, of the operating lever 33 thereon and adapted to be turned downwards for engaging the last matrix composed, the handle 35 for moving the operating lever 33 with the resistant $v$ and the composed line forward to the vertically movable yoke 32, the roller 147 on the operating lever 33, the cam 148 hinged to the machine frame and adapted to be turned upwards by the roller 147 during the forward movement and to strike same and thereby turn the operating lever 33 upwards into a nearly vertical position during the return, and the leaf spring 150 adapted to actuate the roller 147 for turning the erected operating lever 33 into its initial position.

17. In linotype and other type casting machines, the combination with a yoke vertically movable in the machine frame and adapted on being dropped to present the composed line of matrices and space bars to the mold, of a mechanism for operating the melting-pot and the means for trimming and ejecting the cast linotype, a driving shaft for driving said mechanism, a driving pulley loose on said driving shaft, a friction clutch fast on said driving shaft and comprising a spring-pressed lever reaching with its free end to near the shaft, a shaft at right angles to said driving shaft, an arm fastened on said shaft and provided at its free end with an eye which surrounds said driving shaft and is adapted to press on the spring-pressed lever of said friction clutch for coupling it with said driving pulley, a weighted arm fastened on said shaft, and means controlling said weighted lever and adapted to be actuated by the dropping yoke for engaging said friction clutch.

18. In linotype and other type casting machines, the combination with the driving shaft 61 adapted to drive the casting, trimming and ejecting mechanism, of the driving pulley 67, 68 loose on the shaft 61, the friction clutch 65, 69 adapted to couple the shaft 61 with the driving pulley 67, 68 and comprising the bent lever 64, 66, the spring 70 for withdrawing the lever 64, 66 and thereby disconnecting the friction clutch 65, 69 from the driving pulley 67, 68, the shaft 59, the arm 60 having the eye 62 surrounding the shaft 61 and adapted to press on the lever 64, the weighted lever 58, and means controlling the weighted lever 58 and adapted to be actuated by the dropping yoke 32 for engaging the friction clutch 65, 69.

19. In linotype and other type casting machines, the combination with a rail, of a slide movable on said rail and carrying a mold, knives on said rail for trimming the foot and "burs" of the cast linotype, a shaft set by the dropping yoke or elevator to rotate, a cam drum on said shaft, a lever mounted on the machine frame to rock and pivotally connected with said slide, a roller on said lever and operated from said cam drum, a cam disk on said shaft, and an ejector operated from said cam disk, said cam drum and said cam disk being so shaped, that first said mold is moved from the casting position to the ejecting position during which movement the foot of the cast linotype is trimmed whereupon said ejector pushes the linotype a little forward in the mold and withdraws, next the mold is moved back from the ejecting position to an intermediate position during which movement the "burs" of the linotype are trimmed, afterwards the mold is moved to the ejecting position, whereupon the ejector completely ejects the trimmed linotype and withdraws, and at last said mold is returned to the casting position.

20. In linotype and other type casting machines, the combination with the rail 84, of the slide 83 movable thereon and carrying the mold 82, the bracket 84¹ with the trimming knives 90, 90¹ and 91, the shaft 71 set by the dropping yoke 32 to rotate, the cam drum 77, 78, the lever 85 rocking on the machine frame and pivotally connected with the slide 83 by means of the link 87, the roller 88 engaging in the groove 78 of the cam drum, the cam disk 92 on the shaft 71, and the ejector 89 thereby operated, the cam drum 77, 78 and the cam disk 92 being so shaped that first the mold 82 is moved from the casting position to the ejecting position during which movement the foot of the cast linotype is trimmed whereupon the ejector 89 pushes the linotype a little forward in the mold and withdraws, next the mold 82 is moved back to an intermediate position during which movement the "burs" of the linotype are trimmed, afterwards the mold 82 is moved to the ejecting position, whereupon the ejector 89 completely ejects the linotype and withdraws, and at last the mold 82 is returned to the casting position.

21. In linotype and other type casting machines, the combination with a distributer-rail, of feeding screw-spindles, a pair of rails adapted to receive from the vertically movable yoke the line of matrices and space bars and extending to a point beyond the adjoining end of said distributer-rail and provided with shoulders against which the line is pressed, a pair of separators vertically guided for separating the matrices and space bars and lifting them by means of their upper lugs above the shoulders one after the other, a spring-pressed slide horizontally guided and adapted to strike the upper end of the separated and lifted matrix or space bar and to throw it forward into said feeding screw-spindles, and means for periodically withdrawing said spring-pressed slide against the pressure of its spring.

22. In linotype and other type casting machines, the combination with the rails 117, 123 provided with shoulders 114, of the separators 116 vertically guided for engaging beneath the upper lugs of the last matrix or space bar and lifting them above the shoulders 114, the spring-pressed slide 124 adapted to strike the upper end of the separated and lifted matrix or space bar and to throw it forward into the feeding screw-spindles 122, and the cam 126 driven from the machine for periodically withdrawing the spring-pressed slide 124 against the pressure of its spring 127.

23. In linotype and other type casting machines, the combination with the distributing mechanism comprising a driving shaft with a friction clutch and a loose driving pulley, of a bar movable between said distributing mechanism and the vertical magazine and provided with ribs corresponding with those of the magazine, it having a horizontal extension with a hole, and a bent lever rocking on the machine frame in a vertical plane at right angles to said driving shaft and having on its lower arm a pin which normally bears on the horizontal extension of said bar and can engage in the hole of same when its upper arm will strike and stop said friction clutch and thereby said driving shaft.

24. In linotype and other type casting machines, the combination with the bar 129 movable between the distributing mechanism and the vertical magazine 1 and having the extension 142 with the hole 143, of the bent lever 138, 139 rocking on the machine frame and having on its lower arm 139 the pin 141 which normally bears on the extension 142 and can engage in the hole 143 when its upper arm 138 will strike either pin 137 of the friction clutch 136 and thereby stop the driving shaft 135 against the friction of the driving pulley 134.

In testimony whereof we have signed our names to this specification in the presence of two subscribing witnesses.

CHRISTIAN A. ALBRECHT.
CARL MUEHLEISEN.

Witnesses:
WOLDEMAR HAUPT,
HENRY HASPER.